United States Patent [19]

Jornod et al.

[11] Patent Number: 4,817,022
[45] Date of Patent: Mar. 28, 1989

[54] METHOD AND APPARATUS FOR AUTOMATIC OFFSET COMPENSATION IN PARAMETER-SENSING TRANSDUCER SYSTEMS

[75] Inventors: Eugene R. Jornod, Caledonia; James G. Mueller; Matthew S. Solar, both of Rockford, all of Ill.

[73] Assignee: Barber-Colman Company, Rockford, Ill.

[21] Appl. No.: 892,131

[22] Filed: Jul. 30, 1986

[51] Int. Cl.$^4$ .............. G01C 25/00; G01N 7/00; G01L 27/00
[52] U.S. Cl. ............... 364/571.03; 364/558; 73/4 R; 73/765; 73/861.01
[58] Field of Search ............ 364/178, 179, 550, 551, 364/558, 571, 573, 509; 73/1 R, 3, 4 R, 708, 765, 766, 861.01, 861.02, 861.03

[56] References Cited

U.S. PATENT DOCUMENTS

| | | | |
|---|---|---|---|
| Re. 31,222 | 4/1983 | McCracken | 364/571 |
| 4,192,005 | 3/1980 | Kurtz | 364/571 |
| 4,339,943 | 7/1982 | Hedrick | 73/4 R |
| 4,383,431 | 5/1983 | Gelernt | 364/571 X |
| 4,384,925 | 5/1983 | Stetter et al. | 73/1 G X |
| 4,437,164 | 3/1984 | Branch, III | 364/571 |
| 4,446,715 | 5/1984 | Bailey | 73/1 R |
| 4,490,236 | 12/1984 | Petty | 73/1 R X |
| 4,509,007 | 4/1985 | Barsotti et al. | 364/571 X |
| 4,527,600 | 7/1985 | Fisher et al. | 73/861.02 X |
| 4,547,859 | 10/1985 | Wiggins | 364/571 |
| 4,590,791 | 5/1986 | Reed et al. | 73/4 R |
| 4,598,381 | 7/1986 | Cucci | 364/558 |
| 4,672,974 | 6/1987 | Lee | 73/4 R X |
| 4,734,873 | 3/1988 | Malloy et al. | 73/1 R |
| 4,750,464 | 6/1988 | Staerzl | 73/861.02 X |

OTHER PUBLICATIONS

Application Note TN-001, dated Mar. 1985, published by IC Sensors, Inc.
Application Note TN-002, dated Mar. 1985, published by IC Sensors, Inc.
An articles by Jim McDermott entitled "Silicon Fabrication Techniques Extend Sensor Ranges and Designs", appearing at pp. 106–113 of EDN, Dec. 27, 1984.
A product known as DATA PRO (a multiple channel data logger) marketed about 1980 by Barber-Colman Company and described in an unpublished Engineering Report dated Apr. 30, 1980. The Report is submitted as describing what was physically in the product which is acknowledged to be in prior art, but the Report itself is not admitted as constituting prior art.

Primary Examiner—Parshotam S. Lall
Assistant Examiner—Joseph L. Dixon
Attorney, Agent, or Firm—Leydig, Voit & Mayer, Ltd.

[57] ABSTRACT

Methods and apparatus by which a transducer is employed to create a digital signal representing numerically the value of a changeable physical parameter. The signal from the transducer is subject to large and unpredictable amounts of offset due to either or both (i) manufacturing tolerance departures from the desired target of creating a zero output signal value when the sensed parameter is zero and (ii) changes in offset due to changes in one or more physical conditions (other than the sensed parameter) to which the transducer and its associated electrical components are subjected. A bi-state device is associated with the transducer and controlled so as to (a) first apply substitutionally to the transducer a known, and preferably zero, value of the parameter—with the output signal value being stored so as to represent the then-existing offset, and then (b) to apply the changeable physical parameter to the transducer. The stored value of the transducer output signal is, in effect, subtracted from the output signal obtained in the second instance, to produce an accurate final signal numerically representing the existing actual value of the sensed parameter. A programmed microcomputer is preferably employed to carry out the necessary steps in the sequence, and apparatus of that character is described.

13 Claims, 6 Drawing Sheets

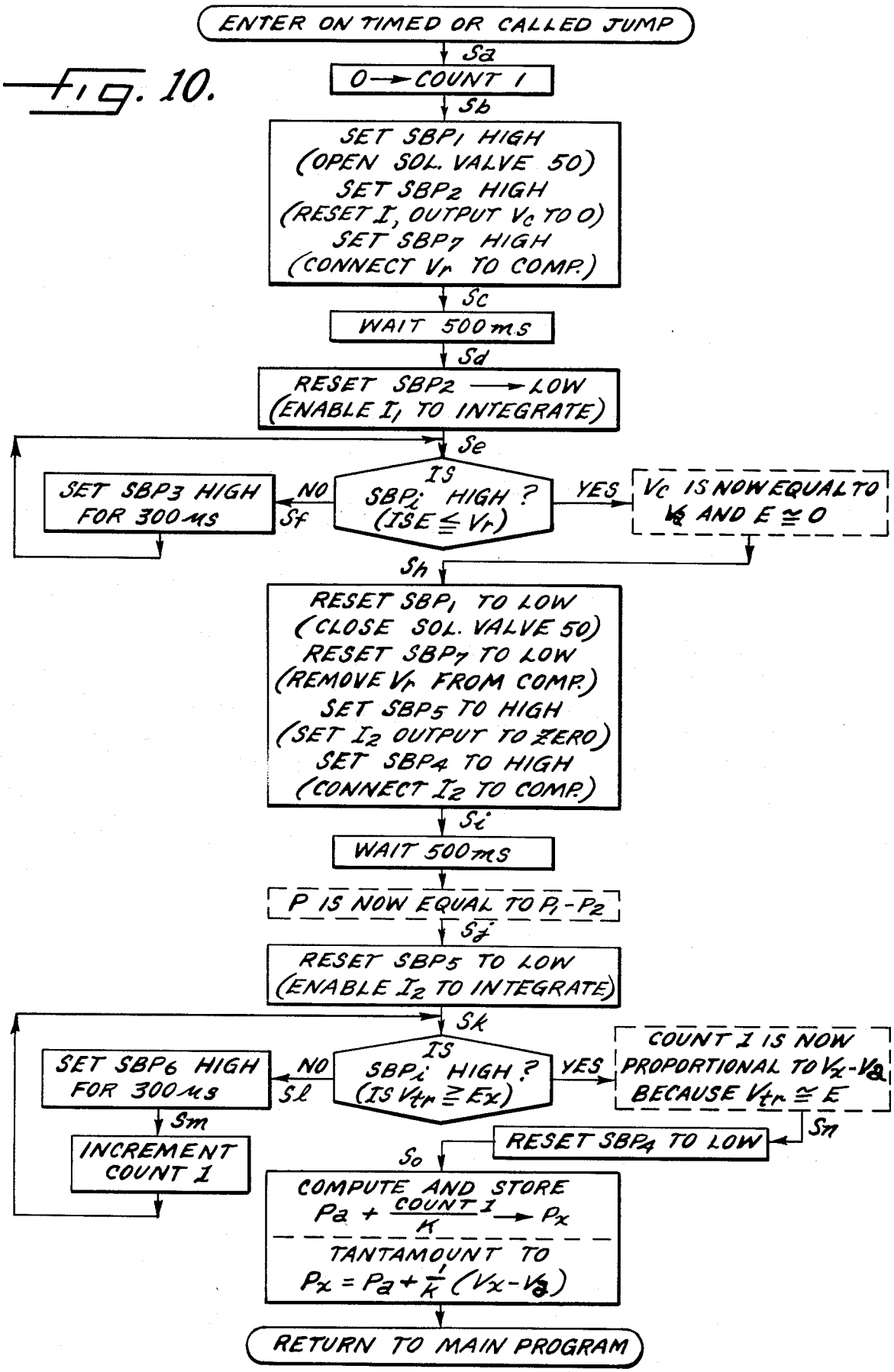

METHOD AND APPARATUS FOR AUTOMATIC OFFSET COMPENSATION IN PARAMETER-SENSING TRANSDUCER SYSTEMS

BACKGROUND OF THE INVENTION

The present invention relates in general to transducers which sense and signal the values of changeable physical parameters such as pressure, temperature, humidity, speed, flow rates and the like. More particularly, the invention pertains to the compensation for, or the elimination of, inaccuracies in the signaled value of a changeable physical parameter due to offset or drift exhibited by a transducer as a result of variations in conditions to which it is subjected.

In many and diverse control systems, a given physical variable is controlled by sensing its value, comparing it with a set point, and energizing some correcting device so as to reduce or eliminate the difference between the desired and the actual values. In some cases the variable is directly sensed and directly corrected; for example the temperature of a room may be sensed and compared with a set point by a thermostat which produces an output signal proportional to the difference or error—and such output signal is utilized directly or indirectly to adjust the rate of fuel input to a furnace burner. In other instances, the corrective action is determined as a function of several changeable factors; for example, the temperature of a room might be correctively restored to and held at a set point by some actuator (such as a motorized fuel valve for a heat-supplying furnace) moved as a combined function of sensed room temperature, set-point temperature, outside air temperature, humidity, and the velocity or volumetric flow rate at which heated air is blown into the room.

In all such diverse control systems, there is a need to sense and signal the value of one or more changeable physical parameters. The word "parameter" should be taken here according to common usage rather than according to a formal dictionary meaning. As used in this application, the term "changeable physical parameter" is to have a generic meaning which designates a physical condition which changes or varies either in an unforeseen or in a generally predictable fashion; it applies to such physical variables as temperature, humidity, linear velocity, rotational speed, pressure in a liquid or gas, flow velocity, volumetric flow rate, chemical concentration, and even the position of a movable member.

It is the province of a "transducer" to sense a changeable physical parameter and produce some type of signal which changes according to a known function with changes in the value of the parameter. The changes in signal magnitude are related, linearly or non-linearly, to the changes in the parameter by a transfer function or scale factor. For example, a d.c. tachometer might be characterized as producing a signal voltage with a transfer function factor of 0.1 volt per r.p.m.; the sensed parameter is rotational speed, but the output voltage signal uniquely relates to and designates the value of the speed at any given time.

It is inevitable, however, that transducers will be subjected to changeable conditions, mostly environmental, other than the sensed parameter. Changes in such other conditions can cause significant, undesired changes in the transducer's output signal, thereby creating inaccuracy in the signaled value of the parameter due to offset or drift. For example, an air filled pressure-sensing bellows coupled to shift the wiper of a potentiometer (and thereby change a signal voltage from the potentiometer) will expand or contract not only as the pressure of the surrounding medium changes but also spuriously as the temperature of that medium changes. Although some transducers are essentially immune from offset changes when the associated physical conditions vary unforeseeably, others exhibit wide changes in their output signals as temperature, humidity, aging, wear, pressure or some factor (other than the sensed parameter) changes. When a very low range (not departing widely from zero) of the sensed parameter is to be signaled, and the gain or transfer function of the transducer per se is relatively low, then changes in offset due to variable conditions may be so great as to dwarf or mask the signal variation resulting from changes in the sensed parameter.

For example, applicants were faced with a specific need to sense and signal the value of a changeable differential pressure created in a Pitot tube used to determine the velocity of flowing air. The differential pressure would vary only from about 0 to 1.5 inches of water column (i.e., from about 0 to 0.054 p.s.i.). One particular type of pressure transducer (namely, a piezoresistive Wheatstone bridge formed by integrated circuit techniques on a silicon chip diaphragm) was desirable for certain characteristics (e.g., small size) but it exhibited large and nonlinear offsets in its output signal with changes in temperature. The offsets of such a silicon transducer are small in relation to the full scale output voltage change if pressure are sensed over a range from 0 to 5 p.s.i., and thus may be reasonably compensated by known use of counteractive temperature sensitive resistors or diodes. But when a full scale range of 0 to 0.54 p.s.i. is to be signaled, the temperature offset in the output voltage may be four or five times the full scale change in output voltage due to changes in sensed pressure. Unless the effects of temperature offset are essentially eliminated, output voltage from such a transducer used over a small pressure range would be useless because the output signal would lack sufficient accuracy and resolution.

OBJECTS AND ADVANTAGES OF THE INVENTION

The principal aim of the present invention is to eliminate offset or drift errors from the output signal of a transducer—and by methods and apparatus which directly determine what the offset is (as conditions causing, and the magnitude of, the offset change) and directly cancel the effect of offset errors.

An important objective is to eliminate inaccuracies, in the final signal which represents the value of a parameter sensed by a transducer, due to offset or drift caused by any and all variable influences on the transducer. For example, where a transducer is employed to sense pressure and its output signal experiences offset due to changes in environmental temperature, humidity and posture—the inaccuracies due to all three such influences will be eliminated from the final signal.

Another object of the invention is to provide methods and apparatus which also eliminate, or compensate for, different offsets due to manufacturing tolerance differences from one to another of a series of supposedly identical transducers—so that all transducers of the series may be used in the same way without "tailoring" the associated apparatus to each transducer, despite the fact that each may have a different amount of manufacturing offset.

A related object of the invention is not only to eliminate inaccuracies due to variable and unforeseeable changes in conditions which create offset in the primary output signal of a transducer, but at the same time and by the same methods and apparatus, to compensate for and eliminate the offset errors arising in components associated with the transducer. For example, where the primary signal of a transducer is processed through one or more amplifiers and an analog-to-digital converter, offset drift due to aging or temperature change in the amplifiers and converter will be eliminated from the final signal which represents the value of the parameter sensed by the transducer.

Still another objective of the invention is to provide a method and apparatus of simple and low cost character which nevertheless dynamically determines, from time-to-time, the existing and changeable offset in a transducer signal and makes a direct and precise correction for that changeable offset each time an updated final parameter-representing signal is needed.

A further object is to provide precise compensation for offset errors in a final signal derived from a transducer despite the fact that the offset magnitude may be large in relation to the full scale change in the transducer output signal. A coordinate objective is to accomplish this with the use of a high gain amplifier having a limited range of its output signal variations but without driving the amplifier into saturation.

And it is another object of the invention to provide a differential pressure transducer system which fully and precisely compensates for all offsets, regardless of the influences which create them, by the association and control of a simple bistate valve coacting with the transducer itself.

DESCRIPTION OF THE DRAWING FIGURES

These and other objects and advantages will become apparent as the following description proceeds in conjunction with the accompanying drawings, in which FIG. 1 is a fragmentary, diagrammatic illustration of an air flow control system shown as one application example in which the method and apparatus of the present invention may be employed;

FIG. 10 is a flow chart setting out a subroutine, loaded in the program memory of the microcomputer shown in FIG. 7, and designating procedural steps executed by computer control.

While the invention has been shown and will be described in some detail with reference to certain preferred embodiments as examples, there is no intention thus to limit the invention to such detail. On the contrary, it is intended here to cover all modifications, alternatives and equivalents which fall within the spirit and scope of the invention as defined by the appended claims.

DETAILED DESCRIPTION OF PREFERRED EMBODIMENTS

Figure 1:
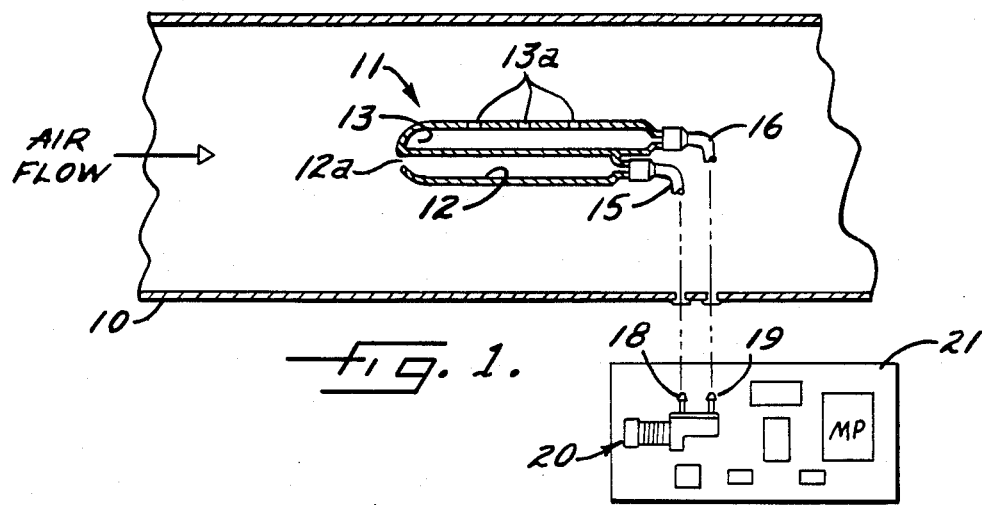

As a typical application utilizing a parameter-sensing transducer system, FIG. 1 illustrates a duct 10 through which air is pumped by a blower (not shown) from a source of heat into a space or room whose temperature is to be controlled. The temperature of that space is in part controlled by varying the speed of the blower (or changing the positions of dampers which admit air into the duct) and thus varying the volumetric rate and velocity of the air stream moving though the duct. The particular rationale for controlling the velocity of the air stream has no direct relevance to the present invention; it will be sufficient to observe simply that the overall control system needs some kind of feedback signal so that it will know the actual velocity (and thus the volumetric rate) of air flowing in the duct at any time. For this purpose, a Pitot tube 11 is disposed in duct.

In well known fashion, the Pitot tube includes first and second chambers 12, 13 with openings 12a, 13a respectively disposed axially and transversely to the flow direction. As air flow velocity increases, the ram effect through the opening 12a increases the pressure P1 in the chamber 12. By contrast, as air flow velocity increases, the Bernoulli effect at openings 13a decreases the pressure P2 in chamber 13. By sensing and signaling the changeable physical parameter constituted by the differential pressure P1−P2, the velocity or flow rate of the air stream may be determined and utilized within the control system which is not fully shown.

The changeable pressures P1 and P2 are transmitted via tubes 15 and 16 to the inlets 18 and 19 of a transducer unit 20. The unit 20 is physically mounted on a printed circuit board 21 disposed exteriorly of the duct 10 and carrying several electrical components associated and coacting with the transducer unit in a fashion more fully described below. In simple terms, the transducer in the unit 20 produces an electric analog signal which changes as a known function with changes in the differential pressure P1−P2 and which thus is a representation, according to a known transfer function, of the value of such differential pressure.

The differential pressure produced by a Pitot tube varies over such a low range of values that the pressure is frequently expressed in known units of "inches of water column" (in.WC). In the present case, the air velocity in the duct may fall anywhere within a range which makes the differential pressure fall between zero and about 1.5 in.WC. Since 1.0 in.WC equates to 0.036 pounds per square inch (p.s.i.), it may be seen that the full range of sensed differential pressure extends from zero to about 0.054 p.s.i. This obviously is a very low range and it requires a sensitive transducer if the actual values of differential pressure are to be signaled with reasonable resolution.

The pressure transducer here chosen is of the type known as a silicon diaphragm, intergrated circuit, piezoresistive bridge sensor. It is characterized by small size, low cost as a result of mass production, consistent elasticity, and reasonably linear response. The silicon "chips"—of N-type material with four P-type resistors formed by diffusion of boron into the silicon diaphragm—are available commercially and their characteristics are well known from the literature. See Application Notes TN-001 and TN-002 published in March 1985 by a company known as IC Sensors, Inc. of Milpitas, Calif. 95035. Such a silicon chip transducer is utilized in the unit 20 and will be briefly described for completeness of understanding.

Figure 2:
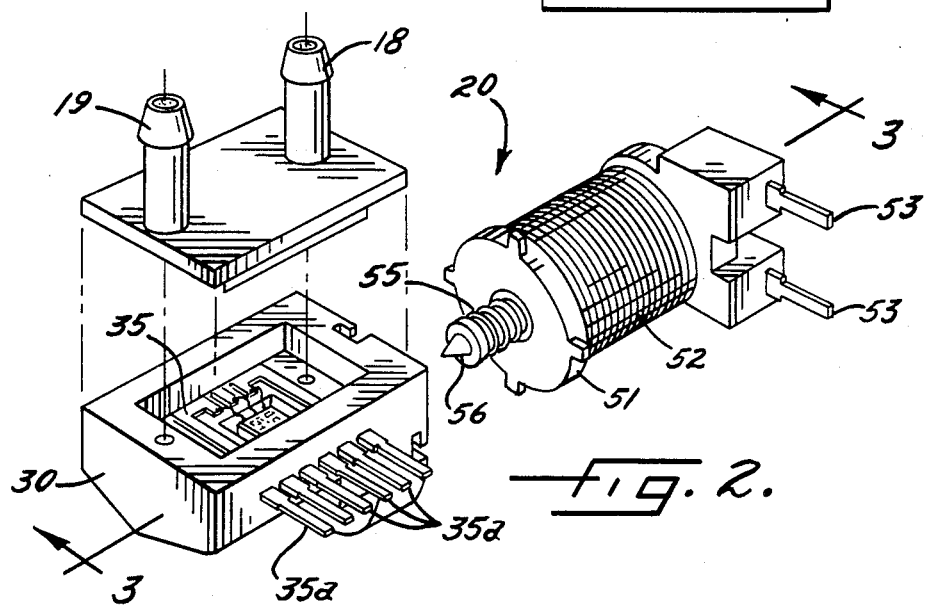
FIG. 2 is an exploded perspective of a differential pressure transducer assembly constructed as one example of a transducer unit usable with and, in part, embodying the invention.
Figure 3:
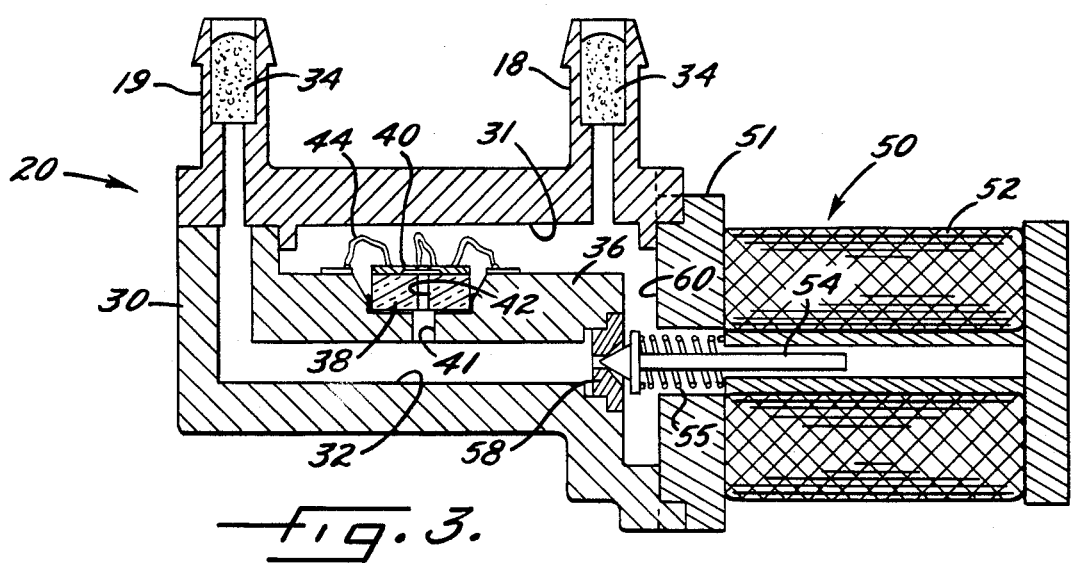
FIG. 3 is a vertical section view taken substantially along the line 3—3 in FIG. 2.
Figure 4:
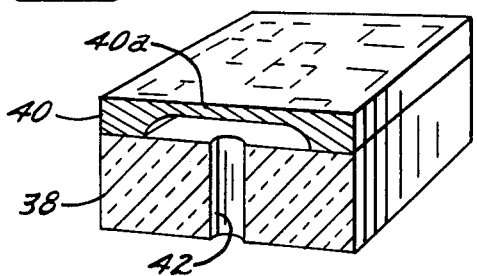
FIG. 4 is a sectioned perspective view of the silicon wafer and mounting base which form a part of the transducer unit.

As shown in FIGS. 2 and 3, the unit 20 is constituted by a body 30 of molded plastic or the like shaped to define two chanbers 31, 32 communicating respectively with the inlets 18, 19 (which contain porous filter material 34). The lower portion of the body 30 is molded to capture a lead frame 35 having six conductive ribbons on the upper surface of a horizontal partition 36 with six lead fingers 35a extending exteriorly. The central region of the partition 36 is depressed to receive a glass or Pyrex base 38 held in place by an appropriate sealing adhesive. To the upper surface of the base 38 (which is preferably made of Pyrex for a low coefficient of expansion and chemical inertness) is bonded a silicon wafer or chip 40. Aligned holes 41 and 42 in the partition and the base place the underside of the chip in communication with the chamber 32, while its upper surface is, of course, disposed in the chamber 31. As shown in FIG. 4, the underside of the chip is relieved by an etching process to create a thin central diaphragm 40a (for example, about 15 mils in thickness) which can flex or strain due to differences in pressure on its upper and lower sides.

Figure 5:
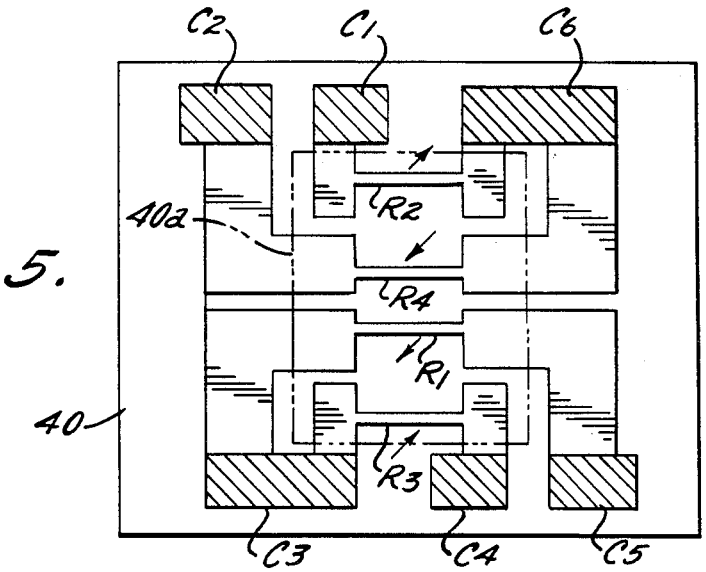
FIG. 5 is an enlarged plan view of the silicon wafer in the transducer.

As seen in the plan view of FIG. 5, the wafer 40 (which may be, for example, about ¼" by 3/16" in size) has four piezoresistive elements formed by diffusion on the central diaphragm. These resistors are designated R1, R2, R3, R4 and shown extending between conductive ribbons which run to connection pads C1–C6 on the thicker, peripheral portion of the chip which is bonded to the base 38. The resistors R1 and R3 share the connection pad C3, while the resistors R2 and R4 share the pad C6. With the chip and base held in the recess of the partition 36 by an appropriate sealing adhesive (FIG. 3), and before the cap portion of the body 30 is cemented and sealed in place, fine lead wires 44 are electrically connected by soldering or pressure welding from each pad to a corresponding part of the lead frame, thereby establishing an electrical connection from each pad to one of the six lead fingers 35a. The cap portion of the body 30 is then cemented and hermetically sealed in place.

Figure 6:
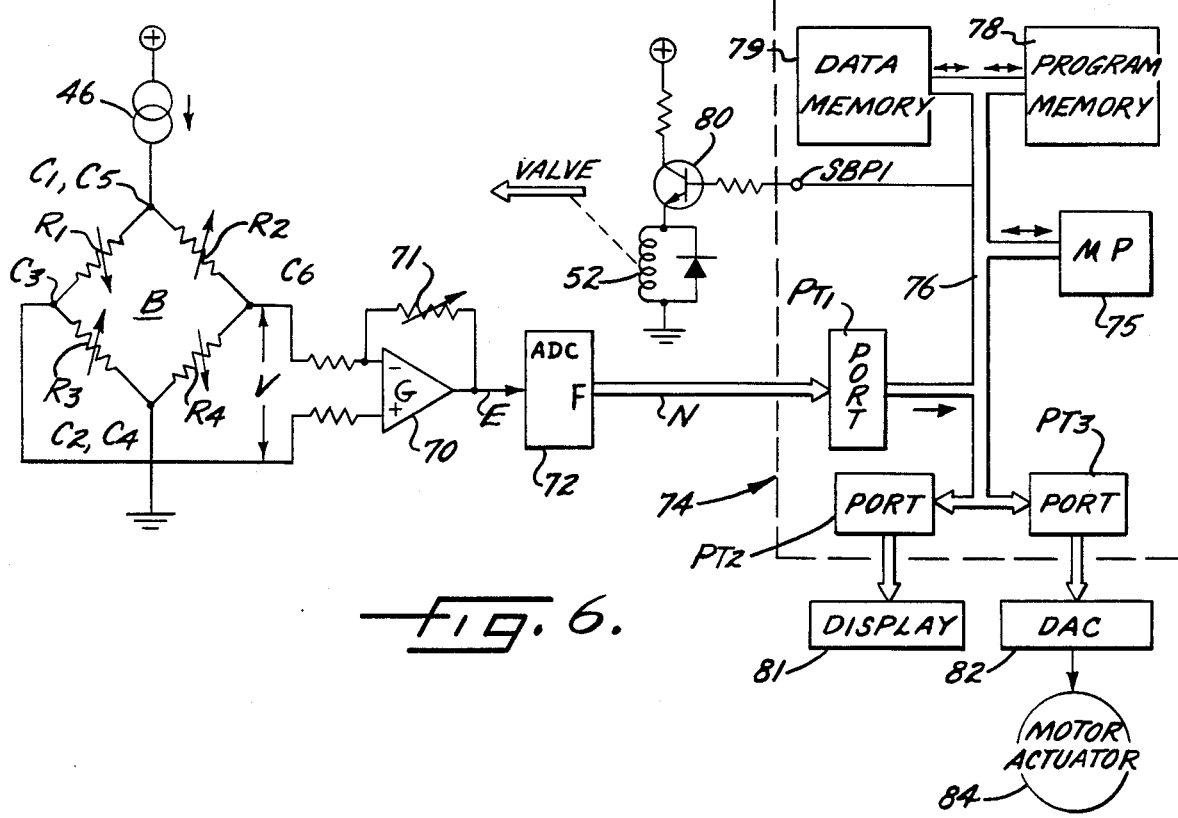
FIG. 6 is a simplified, partially schematic block diagram of electrical components associated with the transducer assembly in accordance with the practice of one embodiment of the invention.

When the lead fingers are appropriately connected (by insertion into a printed circuit board 21, or otherwise), the four resistors R1–R4 form a Wheatstone bridge B, as illustrated in FIG. 6. The bridge may be excited from a constant voltage or a constant current source (the latter represented at 46) and it will therefore produce an output signal V (at the terminals corresponding to pads C6 and C3) which changes in magnitude and polarity according to the extent and sense of bridge unbalance. The resistors R1–R4 act as strain gages so that their ohmic values change with deflection of the diaphragm 40a, and their ohmic values also change because of a piezoresistive effect. The diagraphm 40a and the deposition of the resistors thereon is such that its deflection in one direction causes resistors R2 and R3 to increase in value while resistors R1 and R4 decrease in value. Thus, the bridge is "fully active" and the output voltage V changes appreciably for a given change in the differential pressure applied to the diaphragm 40a.

In accordance with one aspect of the present invention, a bistate device is associated with the transducer 40 and arranged such that in a first of its states it causes the changeable physical parameter, which is to be sensed, to be applied to the transducer. On the other hand, that bistate device is arranged and associated with means such that in the second of its two states it substitutionally applies to the transducer the same physical parameter but with a known, predetermined value. In the specific example of the transducer unit 20, the bistate device takes the form of a solenoid valve 50 controllable by energization or deenergization of its coil to reside respectively in second and first states. The valve 50 is arranged such that when it is deenergized and thus closed, the differential pressure P1−P2 is applied to the opposite sides of the transducer wafer 40. But, when excited and opened, the valve completes a path communicating between the chambers 31, 32 and therefore sets the value of the differential pressure from Pitot tube 11 and normally seen by the transducer wafer 40 to a substituted, predetermined known value—which in this instance is advantageously zero.

As shown in FIGS. 2 and 3, the right wall of the body 30 is constituted by the left end of a coil bobbin 51, that left end or flange being suitably connected and sealed to the body 30. A solenoid 52 is wound on the bobbin 51 with two terminal fingers 53 brought out through the extremity of the bobbin so they can be inserted into holes of the circuit board 21 when the lead fingers 35a are inserted through another set of spaced holes. Within the bobbin is an axial passage containing a rod-like armature 54 biased toward the left by a suitable compression spring 55. When the solenoid is energized, the electromagnetic field pulls the armature toward the right (FIG. 3) against the bias of the spring. The armature at its left end carries a valve element 56 normally urged by the spring 55 into closing engagement with a conical valve seat 58 disposed at the right end of the chamber 32. The right side of the valve seat leads through a path 60 to the chamber 31. Thus, the solenoid valve 50 in its deenergized and energized states respectively breaks or makes (interrupts or completes) a path establishing communication between the chambers 31 and 32. When the valve is energized, the pressures within those two chambers become equal, and the transducer wafer 40 sees a substituted differential pressure which is of a predetermined known value (specifically, zero).

The mechanical parts in FIGS. 1–5 are drawn with no attempt to ahcieve an accurate scale. It should be stated here, therefore, that the valve seat 58 and the armature 54 should preferably be sized to make the area of opened valve passage greatly larger than the area of the conduits through the inlets 18 and 19. This will assure that there is essentially zero pressure drop across the opened valve passage due to flow of air from inlet 18 to inlet 19 occasioned by the fact that the pressures P1 and P2 in the Pitot tube chambers 12 and 13 are not equal and the physical differential pressure at the Pitot tube 11 is not zero. With essentially zero pressure drop across the opened valve, the differential pressure DP in the chambers 31, 32—as seen by the diaphragm 40a—is substitutionally set to zero. The chambers 31, 32 are preferably made small in volume so that they stabilize at the respective pressures P1 and P2 supplied from the Pitot tube 11 promptly after the valve 50 is reclosed.

As mentioned above, the output voltage V from the bridge B will exhibit changes as a known function of changes in the differential pressure P (Note: the symbols P or DP will be used interchangeably herein to designate the differential pressure P1−P2, which is the sensed changeable parameter in the exemplary embodiment). As illustrated graphically by the curve or line 61 in FIG. 8, when the temperature of the transducer wafer 40 is 25° C. (72° F., and here called "standard conditions"), the output voltage will change according to the function $$\Delta V = k \Delta P \quad (1)$$

where k is the slope dV/dP of that line. It may be noted that even under standard conditions the output voltage V is not necessarily zero when the pressure P is zero; on the contrary, the voltage V may have a finite value $V_{so}$ offset from zero by the amount A. The initial offset A differs for different silicon chip transducers due to manufacturing tolerances; it may be quite large (e.g., 100 mv.) in relation to the full scale change $\Delta V$ (in the example of FIG. 8, about 1.50 mv.) resulting when $\Delta P$ is at its maximum (e.g., about 0.055 p.s.i.). Thus, the equation for the line 61 becomes $$V = V_{so} + kP \quad (2)$$

From this, —and if "standard conditions" always existed—one could determine the actual value of the differential pressure P from the value of the output voltage V, that is:

$$P = 1/k (V - V_{so}) \quad (2a)$$

The use of the last-stated equation is prohibited, however, by the fact that the silicon transducer is not temperature stable. Indeed, it is very sensitive to changes in its temperature which result in wide offsets in the output voltage V. As qualitative (not rigorously quantitative) examples of this, the output voltage V vs. differential pressure P is plotted in FIG. 8 by lines 62 and 64 for ambient temperatures of 4° C. and 60° C., respectively. The slope and shape (linear in the present example) of the voltage vs. pressure relationship at 4° C. and 60° C. is essentially (but not rigorously) the same as that for the 25° C. relationship in these silicon wafer type transducers. Thus, it is sufficiently accurate to assume that the $\Delta V$ vs. $\Delta P$ linear relation is the same, and has the same slope k, at any temperature to which the transducer may be subjected during the intended actual use. There is thus a whole family of lines (typified by 61, 62 and 64) which represent the voltage V for any pressure P as the temperature takes on different values between 4° C. and 60° C. (or some other temperature range). Moreover, these lines are not uniformly spaced vertically for equal changes in temperature; that is, the offset changes non-linearly with temperature.

Because the temperature condition experienced by the transducer at any given time is not known nor foreseeable, and because the value of the temperature-induced offset is thus unknown, the voltage V produced by the bridge B simply cannot be used in Eq. (2a) to determine the then-existing value of the pressure P—even assuming that the "standard condition" offset $V_{so}$ and the slope factor k were known. Thus, the art has resorted to the complicated and relatively imprecise use of tailored temperature-compensating resistors or diodes (see the Application Note TN-002 identified above) or to the use of stored, individualized look-up tables in a computer entered according to the value signaled by a second, separate temperature transducer.

In accordance with the present invention, the complexity and shortcomings of prior temperature compensating techniques are overcome by a relatively simple, supplemental device associated with the transducer, and a straightforward series of steps (preferably carried out with the aid of a programmed digital computer) which wholly eliminate inaccuracies due to variable and unknown offsets.

In particular, the bistate solenoid valve 50 is associated with the pressure transducer unit 20, as previously described. It is controlled (energized) first to reside in its second (open) state so that the passage 60 is completed and the parameter P as seen by the transducer chip 40 is set by substitution to a predetermined, known value (here, zero). The output voltage V will thus take on a value $V_{po}$ (FIG. 8) which is the vertical axis intercept for a line 65 representing the voltage vs. pressure relationship for the actual but unknown temperature (whatever it may be) then experienced by the transducer. The value $V_{po}$ will depend upon the temperature, and also upon manufacturing tolerance offset, and may fall anywhere between the zero pressure levels of the lines 62 and 64 as the temperature takes on different specific levels between 4° C. and 60° C.

The voltage $V_{po}$, or more particularly its value, is stored in one form or another and in any appropriate fashion.

Figure 8:
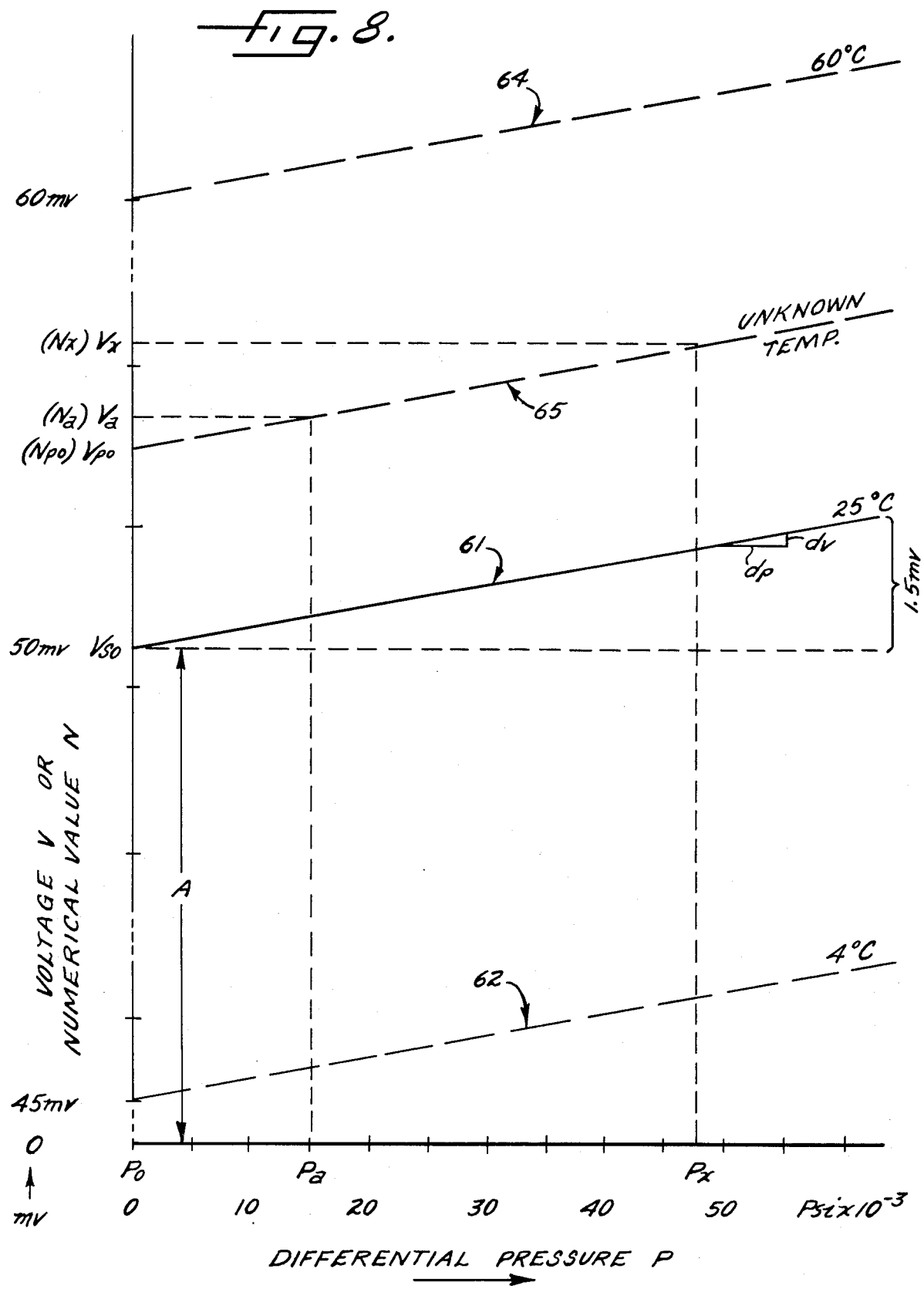
FIG. 8 is a graphical illustration of signal values plotted against the value of sensed differential pressure, the graphs being somewhat idealized and nonrigorous to facilitate description of the significant relationships.

Then, and preferably very promptly, the valve 50 is restored (deenergized) to its first (closed) state, so that the path 60 between the chamber 31, 32 is broken and the diaphragm 40a is subjected to the unknown differential pressure $P_x$ which is to be determined. In consequence, the output voltage V from the bridge B will take on some value $V_x$ (FIG. 8) which depends upon (i) the value of the sensed differential pressure $P_x$, (ii) the value of the temperature then existing and (iii) the value of the manufacturing tolerance offset. It is known that the linear relationship of the line 65 is applicable, and the slope k of that line is known or determinable so as to be known. Thus, the stored value $V_{po}$ is employed in the equation for the function of that line. Since the curve or line 65 may be expressed $$V = V_{po} + kP \quad (3)$$

and $$P = 1/k (V - V_{po}) \quad (3a)$$

the desired, correct value $P_x$ (immune from any offset effects) may be computed and signaled as $$P_x = 1/k (V_x - V_{po}) \quad (4)$$

where $V_{po}$ is the previously stored value, k is the known transfer function or slope of all of the lines in the family of FIG. 8, and $V_x$ is the then-produced value of the voltage V.

One example of apparatus associated with the transducer unit 20, to carry out these procedural steps, includes an amplifier, an analog-to-digital converter, and a programmed microcomputer on the circuit board 21 (FIG. 1). As shown in greater detail by FIG. 6, such apparatus includes a high gain operational amplifier 70 having its inverting and noninverting inputs connected to receive (via conventional input resistors) the output voltage V from the bridge B. A negative feedback resistor 71 may be adjusted to set the gain of that amplifier. The amplifier output voltage E is fed to a wide range analog-to-digital converter (ADC) 72 coupled to a multibit input port PT1 of a programmed digital microcomputer 74. Thus, the voltage V is amplified at 70 to become a correspondingly varying voltage E which in turn is converted into a numerical value represented as a multibit digital signal N applied to the input port PT1.

The microcomputer 74 is of generally conventional organization, and it need not be described in more than general terms. It includes a microprocessor 75 (with a CPU and clock, not shown) coupled to an address and data bus 76 leading to a program memory 78, a data memory 79, and output ports at PT2, PT3. There may be several single bit ports for on-off control, one being shown at SBP1 coupled to the base of a transistor 80 to control turn-on and turn-off of the solenoid 52 in the valve 50.

The output port PT2 may lead to a display unit 81 to show in humanly readable form the numerical value of different data words including, at the option of an operator, a word $P_y$ (to be described) which numerically represents (in units of in.WC or p.s.i) the value of the differential pressure sensed by the transducer 40. The output port PT3 may be used to send a finally computed, numerically determined command signal via a digital-to-analog converter 82 (and a driver amplifier, not shown) to a motor actuator 84 which correctively influences the air stream flow rate, or some other variable, in the control system which is only partially represented in FIG. 1.

The program memory 78 is loaded with an executive program, executed by frequently repeated iterations, having appropriate interrupts and jumps depending upon the value of the signal $P_y$ and perhaps inputs fed to other ports (not shown). Its principal purpose is to compute, according to some selected algorithm, the command value fed to the port PT3 and which effects the final control action by adjustment of the motor actuator 84. One quantity needed and used in the control algorithm is the value of the differential pressure P (i.e., P1−P2) produced by the Pitot tube 11 (and from which the air flow rate in duct 10 may be computed). Because that pressure P is changeable, the overall executive program includes a subroutine which is entered and executed when a current or updated value for the changeable pressure P is required.

While the complete executive program in the memory 78 can take many specific forms depending upon the particular control system with which the transducer is associated, and because the complete executive program is not material to an understanding of the present invention, it is here neither illustrated nor described. An example of one updating subroutine is, however, set out by the flow chart in FIG. 9.

From time-to-time, the subroutine is entered—either on a regularly timed interrupt schedule or by logical jumps from the main routine—each time that an updated value for the differential pressure is needed. The subroutine begins at Step S1 by which the single bit port SBP1 (normally residing at "low" or zero voltage) is set to a "high" or logic 1 voltage level. This turns on the transistor 80 and sends exciting current through the solenoid 52, thereby setting the valve 50 to its second (open) state. The differential pressure P across the transducer is thus substitutionally set to a known value, which in this case is zero. To allow sufficient time for the valve to act and the pressure P as seen by the transducer to reach zero, Step S2 in FIG. 9 interposes a short delay on the order of 400 ms.

The voltage V from the bridge B therefore takes on some value $V_{po}$ (FIG. 8) which is the vertical axis intercept (the bridge voltage when the pressure P is zero) for that one (here, line 65 as an example) of the family of curves corresponding to the then-existing temperature of the transducer wafer 40. The voltage E therefore takes on a value $E_{po}=G \cdot V_{po}$ where G is the gain of amplifier 70; and the digital signal N takes on a value $N_{po}=F \cdot E_{po}$, where F is the transfer function or scale factor for the ADC 72.

Figure 9:
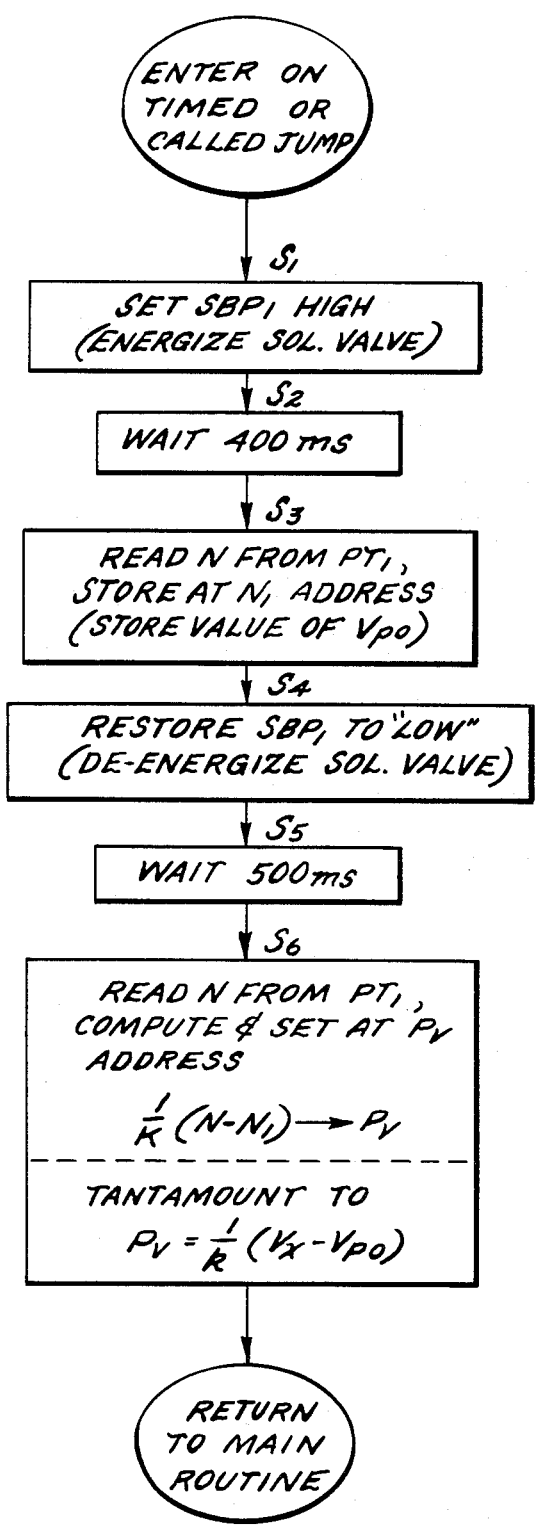
FIG. 9 is a flow chart setting out a subroutine, loaded in the program memory of the microcomputer shown in FIG. 6, and illustrating the procedural steps executed by computer control.

At Step S3 in FIG. 9, the CPU "reads" or takes in the number N (now having the value $N_{po}$) then being applied to the input port PT1 and stores it in active memory as a data word here called $N_1$. Thus, a value is stored at $N_1$ which corresponds to the value $V_{po}$ (FIG. 8) for the voltage vs. pressure curve 65 which is applicable at the then-existing but unknown temperature.

The subroutine at Step S4 next makes the port SBP1 go "low" thereby deenergizing the solenoid valve 50 and reapplying the pressures P1, P2 from the Pitot tube 11 to the silicon diaphragm 40a. Step S5 creates a short delay to make certain that the valve 50 has closed and the pressures P1, P2 have stabilized in the chambers 31, 32 at some unknown differential pressure value labeled, by example, $P_x$ in FIG. 8. Voltage V, voltage E and signal N now take on values which correspond to the voltage $V_x$ in FIG. 8—this being determined by the pressure $P_x$ as well as by the changeable and unknown offset $V_{po}$. With the signal N at port PT1 now equal to $N_x$, the CPU at Step S6 computes the difference $N-N_1$ and divides it by a factor K to obtain and store a numerical data word $P_y$ that represents the actual value of the then-existing differential pressure value $P_x$. The composite transfer factor K is pre-established and pre-stored as a constant in the computer data memory. If, as noted above, $E = G \cdot V$ and $N = F \cdot E$, where G and F are gain and scale factors for the amplifier 70 and the ADC 72, one may view the graphs in FIG. 8 as if the variable N were represented along the vertical axis (ordinate) to see the manner in which N changes as differential pressure P takes on different values. The variable N is thus the equivalent or alter ego of the variable voltage V. Therefore, the relationship represented by Eq. (4) may be restated in terms of the digital signal N by recognizing that $$N = F \cdot E = G \cdot F \cdot V \qquad (5)$$

so that $$V = N/(G \cdot F) \qquad (5a)$$

and Eq. (4) can be restated:

$$P_x = \frac{1}{k}\left(\frac{N_x}{GF} - \frac{N_{po}}{GF}\right) \qquad (6)$$

If a composite constant K is designated as being $$K = G \cdot F \cdot k \qquad (7)$$

then Eq. (6) becomes $$P_v = P_x = 1/K\,(N_x - N_{po}) \qquad (6a)$$

Thus, in Step S6 of the subroutine (FIG. 9), where the current value of N has the previously stored value $N_1$ subtracted from it, the subtraction is in fact $N_x - N_{po}$, whereupon the computed and stored data word $P_v$ is the updated and offset-compensated value $P_x$ of the then-sensed differential pressure P.

The data word $P_v$, representing the current value of the second parameter P, may, according to the main program, be pulled from memory to the port PT2 and shown on the display unit 81 if that should be desired; and that data word $P_v$ may be used in further calculations (carried out in the main program) which determined the magnitude and sense of a command word sent to the port PT3 to determine the energizing voltage applied to the motor actuator 84.

It is a simple matter to select and store in the computer a desired value for the composite transfer factor K. Indeed, one may choose the factor K to be the same for a whole series of printed circuit boards 21 which are to be manufactured with transducer units 20 thereon, despite the fact that the voltage slope k for individual transducers may be somewhat different. After each one of the circuit boards 21 (FIG. 1) has been built, the microcomputer thereon is placed under manual control for stepping through the subroutine of FIG. 9. A factory technician first makes the single bit port SBP1 go high to open the valve 50 so that the sensed pressure is artificially set to zero, and he then steps through the subroutine to make the number $N_{po}$ signaled at the output of the ADC 72 be stored at memory location $N_1$. Then, the factory technician makes the valve 50 close and he applies a known and preferably full-scale differential pressure (say, 2.0 in.WC) to the inputs of the transducer. The difference $N-N_1$ (where N is the value of the ADC output with that known 2.0" pressure applied and $N_1$ is $N_{po}$) is computed and shown on the display unit 81. This procedure is repeated in a series of cut-and-try attempts. The gain G produced by the amplifier 70 is changed after each repetition by adjusting the feedback resistor 71 until the subtraction produces a result which satisfies the expression $$N - N_1 = K \cdot \Delta P = 100 \times 2.0 \qquad (7a)$$

it being assumed here by way of example that K has been selected and pre-stored as 100 units per in.WC and the known pressure applied to the transducer is 2.0 in.WC. Since K is a preselected, stored value in memory, the adjustment of the gain G forces the product of $k \cdot G \cdot F$ to become equal to the pre-selected, desired value of K. The progressive adjustment of gain G changes the difference in $N - N_1$ until it becomes equal to 200, according to the example given here as a specific illustration. This would mean, for example, that whatever the value of the voltage $V_{po}$, and the value of V when sensed differential pressure is 2.0 in.WC, their difference would be 200. Their specific values might be 743-543=200.

Another important advantage flows from the method and apparatus which has been described. The amplifier 70 (and to some extent the ADC 72) in FIG. 6 may exhibit initial offset and drift in offset with age or temperature. Viewing FIG. 8 as a plot of the digitial signal N vs. differential pressure P, there will be some initial and some changeable offset created in the value $N_{po}$ due to the amplifier 70 as well as that due to the transducer 40. But when the value $N_{po}$ is stored as $N_1$ (see Step S3 in FIG. 9), the combined offsets created in the transducer and its associated electrical components are reflected in that value. Thus, the subtraction $N - N_1$ (which is actually $N_x - N_{po}$) in Step S6 results in the elimination of inaccuracy due to all offsets—and on a dynamic basis each time the subroutine of FIG. 9 is executed.

As thus far discussed, the bistate valve 50 when in its second state substitutionally sets the applied pressure P to a known value of zero. In the generic aspects of the invention, however, any predetermined known value of the sensed physical parameter may be substitutionally applied to the transducer by the bistate device in its second state, and the resulting transducer output, as represented by the digital signal N, may be stored for offset correction. For example, if the apparatus associated with the transducer includes a source of known differential pressure $P_a$ (which is other than zero, see FIG. 8), some means or device analogous to the valve 50 may be controlled to send that known pressure to the transducer diaphragm 40a. FIG. 8 treats this as the general case, where $P_a$ is labeled as the predetermined, known pressure which is applied when the bistate device is in its second state at Step S3 in FIG. 9. Some value $V_a$ (rather than $V_{po}$) will be produced at the bridge output, resulting in an amplified voltage $E_a$ from the amplifier 70 and a corresponding numerical value $N_a$ for the digital signal N. The voltage $V_a$, or the digitally signaled value $N_a$, is stored as $N_1$. Then, after Step S4, the actual sensed differential pressure $P_x$ is applied to the transducer by the bistate device in its first state, so the voltage V takes on a value $V_x$ and the digital signal N takes on a value $N_x$. From FIG. 8 it may be seen that the then-existing differential pressure value $P_x$ is determinable from $$P_x = P_a + 1/k\,(V_x - V_a) \qquad (8)$$

where $P_a$ is a known value. It will be seen that Eq. (4) is a simply a special case of Eq. (8) taken with $P_a$ as being zero and with $V_{po}$ as the value of $V_a$ when substitutionally applied pressure at the transducer is zero.

The computation of Step 6 in FIG. 9 is easily modified to accommodate the general case of Eq. (8). The predetermined, known value of $P_a$ is simply prestored as a constant in the computer memory. After Step S3, the value stored in memory location $N_1$ is inherently some unknown value $N_a$ corresponding to the voltage $V_a$ (rather than $V_{po}$) in FIG. 8. At Step S6, the computer will use the value $P_a$ to compute and store $$P_a + 1/K\,(N - N_a) \rightarrow P_v \qquad (9)$$

so the derived numerical data word $P_v$ represents the value $P_x$ as labeled in FIG. 8.

If the invention is practiced with the apparatus of FIG. 6, the amplifier 70 will in most cases need to have a wide operating range so as to avoid saturation, and the ADC 72 may need to be rather large (e.g., 12 or 16 bits wide). For example, and even though the bridge output voltage varies over only a small span of about 1.5 or 2.0 millivolts due to pressure changes over an intended range of 1.5 or 2.0 in.WC, the manufacturing tolerance offset from one transducer to the next, and the offset voltage due to temperature changes, may make the range of absolute values for the voltage V extend from, say, 10 mv. to 100 mv. To amplify such a range of input values by a high gain G on the order of 1,000 (for obtaining better resolution in the signal E and the signal N), the amplifier would need to be capable of producing an output voltage over a linear range from 10 volts to 100 volts without saturating. The amplifier, the ADC, and the associated voltage supply would thus be costly.

In the preferred practice of the invention, the need for a wide range amplifier (to avoid saturation) and the need for a large, multibit analog-to-digital converter are avoided. Despite the extremely wide range of possible values for the voltage V, commercially available and relatively low cost amplifier components may be employed while avoided deleterious effects of saturation and still obtaining high gain and good resolution. This preferred embodiment of the method and apparatus are illustrated in FIGS. 7 and 10.

Figure 7:
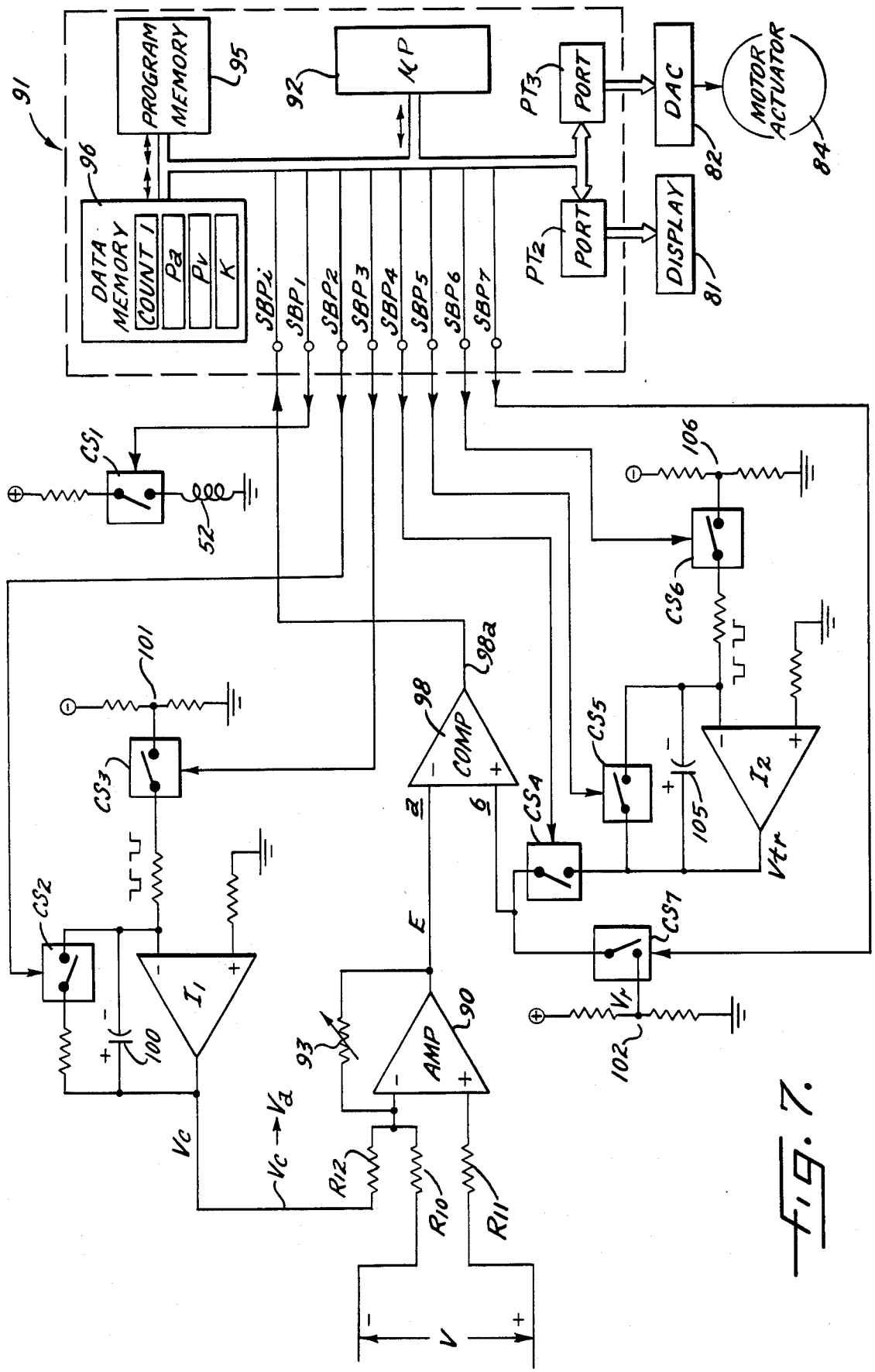
FIG. 7 is similar to FIG. 6 but illustrates a modification in the electrical components for use in the practice of a second embodiment.

As shown in FIG. 7, the bridge output V is applied via equal input resistors $R_{10}$, $R_{11}$ to the inverting and non-inverting inputs of a high gain, algebraic summing amplifier 90 which receives a second, correction voltage $V_c$ via an input resistor R12. The output voltage E is thus a subtractive function of the inputs and may be expressed $$E = G(V - V_c) \text{ tm} \qquad (10)$$

where G is the adjusted gain of that amplifier. If necessary, the bridge B connected in its excitation circuit (see FIG. 6) is associated with adjusting resistors (not shown) which assure that the voltage V at zero pressure is of the labeled polarity and increases with that same polarity as the sensed pressure P increases above zero. Thus, the signal V tends to increase the positive polarity voltage E at the amplifier output, whereas the signal $V_c$ tends to decrease the amplifier output E.

To form what is an analog-to-digital converter, or the equivalent, integrators and a comparator are utilized in conjunction with programmed control by an associated digital microcomputer 91. The computer conventionally includes a microprocessor 92 associated with an address and data bus 94 leading to a program memory 95, a data memory 96 and a plurality of single-bit input and output ports. Merely for purposes of discussion, single-bit output ports SBP1 through SBP7 are shown, together with one input port SBPi. The ports PT2 and PT3 are associated with a display unit 81 and an actuator 84 as previously described with reference to FIG. 6.

There are several controlled switches (actually, solid state gates) shown as CS1 through CS7. When a logic "high" signal from a single-bit output port is applied to the control terminal of such a device, it actuates the gate, i.e., it effectively "closes" or completes a conductive path between input and output terminals. Thus, when the computer 91 makes the port SBP1 go to a high (logic 1) level, the switch CS1 in effect closes and energizes the solenoid 52 to open the valve 50.

The apparatus of FIG. 6 further includes a comparator 98 which in known fashion is constituted by a high-gain operational amplifier without feedback. When the voltage at input terminal a exceeds that at input b, the amplifier saturates in a negative-going sense and the output at 98a takes on a logic "low" level; conversely, when the signal at b exceeds that at a, the output saturates positively and has a logic "high" level. The input terminal a receives the amplifier voltage E and the output 98a is connected to input port SBPi.

As a means to effectively store the offset value $V_a$ of the transducer, an integrator $I_1$ is controlled by the computer 91 in a fashion to be explained. Basically, that integrator is formed by an operational amplifier having a capacitor 100 connected in a negative feedback path—so that as negative polarity input pulses are applied to the inverting input terminal, the output voltage $V_c$ progressively rises in a generally stair-step fashion. Assuming that the output voltage $V_c$ is initially zero, it will rise to a positive value which is proportional to the number of equal-width input pulses which are applied. One such negative input pulse is applied from a suitable constant negative source 101 each time that controlled switch CS3 closes due to a logic "high" voltage being fed from port SBP3 of the computer, the duration of the pulse being equal to the period of closure.

The voltage across capacitor 100 and the output voltage $V_c$ may be reset to zero by closure of a switch CS2, thereby shunting the capacitor so that it discharges through a small current-limiting resistor.

The non-inverting terminal b of the comparator 98 receives either of two input voltages depending upon whether the switch CS7 or CS4 is closed. In the first case, switch CS7 feeds a reference voltage $V_r$ (which may be zero but preferably is just slightly positive or about 0.1 volts) from a source 102. In the second case, the input terminal b receives the output voltage $V_{tr}$ of an integrator $I_2$ (organized essentially like the integrator $I_1$) which includes a capacitor 105 and is controlled by switches CS6 and CS5. Each time the port SBP6 goes to a logic high for a predetermined interval, the switch CS6 sends a negative pulse from a source 106 to the inverting input terminal of the integrator $I_2$, and the output voltage $V_{tr}$ increments upwardly by a predetermined amount.

The program memory 95 may be loaded with an executive program organized to carry out a complete control system algorithm (as explained with reference to FIG. 6) and that main program includes a subroutine which is entered at timed interrupts or by logical jumps each time that an updated value of the changeable parameter P is desired. Of course, if only a digital signal representing, or numerical display of, of the value of the parameter P is required, the subroutine may be executed iteratively without relation to any main program. It should be noted that the data memory includes address locations for many numerical data words, and for convenience of description four such words are designated in FIG. 7 as COUNT 1, $P_a$, K and $P_v$.

One example of a program subroutine (loaded in the memory 95 and executed by the computer 91) is set out by the flow chart of FIG. 10. The memory word K will have been loaded with a constant of desired value which defines the composite transfer function in numerical units per unit of pressure change ($K = \Delta N/\Delta P$) as previously described. After entry into the subroutine, at Step Sa the data word COUNT 1 is cleared to hold a zero value.

At Step Sb, several output ports are set to a high or logic 1 potential. Specifically, SBP1 is made "high"; as a result, the switch CS1 is closed, the coil 52 is excited, and the solenoid valve 50 is actuated, thereby substitutionally setting the differential pressure P to a predetermined and known value $P_a$. The port SBP2 is also made high so that the switch CS2 is closed to discharge the capacitor 100 and set the voltage $V_c$ to zero. Also, the port SBP7 is driven to a logic high level so that the switch CS7 closes and the reference voltage $V_r$ is applied to the comparator input terminal b.

At Step Sc, further operation of the computer is delayed for a predetermined interval, here chosen as 500 ms, so that the pressures in chambers 31, 32 have time to stabilize and the capacitor 100 has time to fully discharge and make voltage $V_c$ zero. At Step Sd, the port SBP2 is restored or a logic "low" potential, so that the switch CS2 reopens and the integrator $I_1$ is able to respond to input pulses.

At Step Se, the CPU interrogates the status of the input port SBPi to determine whether the output of the comparator 98 is at a logic "high" or a logic "low" level. So long as the voltage E is greater in magnitude than the reference $V_r$, the comparator output at 98a will be low, and this condition exists when Step Se is first entered. If SBPi is found low, the subroutine program proceeds to Step Sf and makes the output port SBP3 high for a predetermined pulse interval, here chosen as 300 microseconds. The switch CS3 thus closes for 300 microseconds and applies a negative voltage pulse of predetermined magnitude to the integrator $I_1$, causing the voltage $V_c$ to increment upwardly by a small positive step. The computer then returns to and repeats Step Se. Steps Se and Sf will be repeatedly executed by looping action with the voltage $V_c$ progressively increasing until Step Se results in an affirmative response which causes the program to progress to Step Sh. At this point (and as labeled in FIG. 10), the stored voltage $V_c$ will have a value $V_a$ which, for all intents and purposes, is equal to the bridge voltage V then existing with the pressure $P_a$ existing at the transducer. See FIG. 8. Also, the output voltage E from amplifier 90 will have been reduced approximately to zero. When that point was reached, the output of comparator 98 switched from a logic "low" to a logic "high" level and thus Step Se found an affirmative response.

With reference to FIG. 8, it may be seen that the value of the stored voltage $V_c$ now supplied from the integrator $I_1$ is essentially equal to the unknown voltage $V_a$ which corresponds to the known, applied value $P_a$ of differential pressure P. This assumes, of course, that the amplifier E does not itself produce any offset. If amplifier offset exists, the value of the stored voltage $V_c$ will differ from the value $V_a$ by an amount necessary to make the voltage E essentially zero—and this will be seen later to compensate for unknown offsets both in the bridge output signal V and in the amplifier 90.

At Step Sh in FIG. 10, the computer exerts control action on several of the single-bit output ports. Specifically, port SBP1 is reset to a logic "low" level; and the switch CS1 opens to deenergize the solenoid 52, causing the valve 50 to close, and therefore applying the pressures P1, P2 from the Pitot tube 11 (FIG. 1) to the transducer unit 20. The output voltage V from the transducer bridge therefore increases from the value $V_a$ to some value $V_x$ (FIG. 8) which corresponds to the then existing but unknown value $P_x$ of the differential pressure P. Secondly, the port SBP7 is reset to a logic "low" level, thereby opening the switch CS7 and removing the reference voltage $V_r$ from the comparator 98. Thirdly, the port SBP5 is set to a logic "high" level so that the switch CS5 is closed to discharge the capacitor 105 and restore the voltage $V_{tr}$ to zero. Finally, the port SBP4 is set to a logic "high" level so that the switch CS4 closes and the output $V_{tr}$ of integrator $I_2$ is coupled to the input terminal b of the comparator 98.

The computer then proceeds to Step Si to create a predetermined short delay (here 500 ms.) thereby assuring that the solenoid valve 50 has ample time to reclose and the pressures in chambers 31, 32 stabilize at the P1 and P2 values. The capacitor 105 has ample time to fully discharge during this delay interval so the voltage $V_{tr}$ is reset to zero. At Step Sj, the port SBP5 is reset to a low level, so that the switch CS5 opens and the integrator $I_2$ is ready for integrating action.

At Step Sk, a loop is entered similar to that described previously for Steps Se and Sf. Specifically, the input port SBPi is tested and if it is found to reside at a logic "low" level, the computer proceeds to Step Sl to set the port SBP6 high for 300 microseconds. During that interval, the switch CS6 is closed so that the integrator $I_2$ receives a negative voltage pulse of that duration. Thus, the voltage $V_{tr}$ increments positively by a small step. The computer then proceeds through Step Sm where the data word at COUNT 1 is incremented by one numerical unit, after which the operation loops to reenter Step Sk.

It will be apparent that when Step Sk is first entered, the output of the comparator at 98a will reside at a logic "low" level because the value $E_x$ of the voltage E will then be greater in magnitude than the zero value of the tracking voltage $V_{tr}$. This follows from the fact that the value $E_x$ is equal to $G(V_x - V_c)$ which is $G(V_x - V_a)$ because $V_c$ has been made equal to $V_a$. Thus, Steps Sk, Sl, Sm will be repeatedly executed in a loop and the voltage $V_{tr}$ will progressively rise until it becomes very slightly greater in magnitude than the value of the voltage $E_x$. At this point, the output of the comparator 98 will make the port SBPi have a logic "high" potential, and Step Sk will cause the program to proceed to Step Sn. When this point is reached, a numerical value stored in the data word COUNT 1 has been increased to a value proportional to the value $E_x$ of the voltage E, and the numerical value at COUNT 1 is thus representative (by a known scale factor) of the analog value $E_x$. Thus, the integrator $I_2$ with its programmed control and the data word COUNT 1 constitutes an analog-to-digital converter which converts the analog value $E_x$ to a corresponding digitally signaled numerical value stored at the COUNT 1 memory location.

At Step Sn, the port SBP4 is reset to a logic "low" level, thereby opening the switch CS4.

It is to be observed that subtraction occurs in the operational amplifier 90 as a principal step that compensates for offset. That is, the voltgage $V_a$ which is created in and stored by the integrator $I_1$ corresponds to the known, predetermined pressure $P_a$ (FIG. 8). The voltage $E_x$ when Step Sk is entered is expressible from Eq. 10 as $$E_x = G(V_x - V_a) \tag{10a}$$

When Step Sn is reached, the numerical value accumulated in data word COUNT 1 is proportional to $E_x$ by a factor F that is chosen by the designed gain of the integrator $I_2$ and the volt-second content of each of the input pulses applied thereto. Therefore, $$\text{COUNT } 1 = N_x = k \cdot G \cdot F(V_x - V_a) = K(V_x - V_a) \quad (11)$$

As Step So, the computer simply calculates the value of $P_x$ by dividing the COUNT 1 number by the composite transfer constant K and adds the known pressure value $P_a$ to derive and store a value $P_v$ equal to the then-existing differential pressure $P_x$. Therefore, the value $P_v$ is $$P_v = P_x = P_a + \frac{\text{COUNT } 1}{K} = P_a + \frac{1}{K}(V_x - V_a) \quad (12)$$

This will be recognized as identical to Eq. (8).

With the solenoid valve 50 arranged as it is, however, the known value $P_a$ is zero (that is, $P_o$) and the voltage $V_a$ is represented at $V_{po}$ in FIG. 8. Thus, in the specific and preferred arrangement here described, the data word $P_a$ is not required (or is stored with a value of zero), and Eq. (12) is specifically implemented as $$P_v = P_x = \frac{\text{COUNT } 1}{K} = \frac{1}{K}(V_x - V_{po}) \quad (13)$$

The value $P_v$ so determined can be utilized in the main executive program for corrective action in the control system, or it may be displayed—as described above with reference to FIGS. 6 and 9.

In the practice of the invention according to the embodiment of FIGS. 7 and 10, the composite gain factor K may be preselected and stored in the data memory 96. Then the computer is sequenced through Steps Sa through Se in FIG. 10 to set the sensed pressure P artificially to zero and to make the value of the voltage $V_c$ null-out the voltage E and make it essentially zero. Thereafter, a known pressure is applied to the transducer (preferably a pressure of about 2.0 in.WC at full scale) and Steps Sh through Sk are executed with the value of COUNT 1 thereafter being displayed. If the COUNT 1 value so obtained does not satisfy the relationship $$\Delta N = \text{COUNT } 1 = K \cdot 2.0 \text{ in. } WC \quad (14)$$

the gain of the amplifier 90 is changed by adjusting its feedback resistor 93—and the procedure is tried again. When this cut-and-try procedure ultimately results in satisfaction of Eq. (14), then it is known that the composite factor K (constituted by the product of $k \cdot G \cdot F$) is in fact applicable because the value of the gain G has been adjusted as necessary to make that true. In net effect, the transfer function k for the transducer per se has now become known and usable because it is a part of the known composite factor K which relates changes in sensed pressure to changes in the digital signal COUNT 1.

The apparatus and method of FIGS. 7 and 10 eliminates any inaccuracy due to saturation in the main amplifier 90. Assume, for example, that the amplifier has a gain G of 1000 but its output voltage E cannot exceed (saturates at) 4.0 volts. Assuming further from FIG. 8 that the voltage $V_{po}$ is 55 mv., then when Step Se in FIG. 10 is first reached and with $V_c$ at zero volts, the amplifier should make the output E be 55 volts. Instead, that output E will actually be at the saturation value of 4.0 volts. This gross saturation makes no difference to the comparator 98 which yields a "low" output when E is 55 volts, 3.0 volts, or any other value greater than the reference voltage $V_r$ (assumed to be 0.1 volts). As the integrator $I_1$ makes the voltage $V_c$ increase, the net algebraic input $(V - V_c)$ to amplifier 90 will fall from 55 mv. volts down to essentially zero, and thus the amplifier is brought back into its non-saturated linear region of operation. From the example of FIG. 8, if the pressure value $P_x$ later applied to the transducer after Step Sj in FIG. 10 is about 1.5 in.WC and the voltage $V_x$ is 56.5 mv. (with the voltage $V_c$ now being 55.0 mv.), the net input to amplifier 90 is $56.5 - 55.0 = 1.5$ mv., and the amplifier is operating in its linear, unsaturated region with its output voltage E being 1.5 volts.

In FIGS. 6 and 7 the main amplifiers 70 and 90 have been shown in simplified form as a single stage operational amplifier and common mode voltage from the bridge B has been ignored—merely to facilitate clear description of the significant relationships. In commercial products, multi-stage amplifiers will normally be used, and their circuits will be arranged to reject common mode influences; such being matters of design choice to be exercised by those of ordinary skill in the art.

RESUMÉ

It may now be seen that the present invention in certain and preferred aspects brings to the art a method and apparatus by which physical pressure of very low value, and which varies over a narrow range (0 to about 0.054 psi), may be sensed and signaled by use of a transducer that produces a primary signal V which changes over only a small full-scale span (e.g., about 1.5 mv.) but which may have a zero pressure value $V_{po}$ falling anywhere within widely separated values (e.g., from 10 to 100 mv.) due to manufacturing tolerances and/or unknown temperature-induced offset changes. By providing and controlling a bistate device such as the solenoid valve 50, the actual and unforeseeable value of the offset is determined and represented as a stored signal ($N_1$ in FIGS. 6 and 9; $V_c$ made equal to $V_a$ in FIGS. 7 and 10) when a zero value of the differential pressure is artificially applied to the transducer. In its other state, the bistate device couples the actual differential pressure P to the transducer; the stored signal value is subtracted from the then obtained output signal value to eliminate the offset in the latter, the final signal thus being free of offset effects and accurately representing the existing pressure value.

In it broader and generic character, however, the invention will find advantageous application with transducers which sense and respond to physical parameters other than pressure. It may be employed with transducers which sense humidity, linear velocity, rotational speed, chemical concentration, flow rate or physical position—to name a few examples. Any transducer which exhibits changes in its output signal due to changeable factors or physical conditions (other than the sensed parameter) will be enhanced by the use of the method and apparatus here described, and even when the range of possible offsets is not so pronounced as in the case of the silicon diaphragm transducer discussed as a specific example.

Similarly, and as explained, the bistate device need not be associated with means to articially set the parameter, as seen by the transducer, to zero. It may artificially apply to the transducer some predetermined and known value ($P_a$ in FIG. 8) of the parameter, so that the resulting signal which is stored reflects the then-existing and unknown offset, whatever it may be, and can be used in a subtractive sense to eliminate offset inaccuracy.

The subtraction may be effected with digital signals (FIGS. 6 and 9) or with analog signals (FIGS. 7 and 10). While the use of a programmed digital computer is preferred, the same results can be obtained with an analog computer in straightforward fashion by sequenced switching of inputs to algebraic adding circuits, dividing circuits, multiplying circuits and sample-and-hold amplifiers—to yield a final, compensated analog output signal.

While the known function which relates changes in output signal to changes in the sensed parameter is linear in the case depicted by a family of lines in FIG. 8, the invention may also be practiced when the transducer operates according to a family of non-linear but monotonic curves. So long as the function, linear or non-linear, is known, the compensated final signal may be arrived at by appropriate computations (in a digital computer or otherwise) after the corrective subtraction has been made.

In a specific aspect, the invention is carried out with the advantage of low cost, commercially available electrical components (operational amplifiers) operated with low cost power supplies—while nevertheless avoiding amplifier saturation. In mass produced products, this cost advantage is of considerable significance. Viewed in another sense, the invention achieves accurate signaling of a sensed changeable parameter with a transducer of low quality and low cost compared to more expensive transducers which would not exhibit offset variations of unacceptble magnitude. This, too, is of economic significance in the manufacture of transducers which become a part of open or closed loop control systems.

In some of the claims which follow, certain symbols are used to provide clarity and ease of understanding. Such symbols are not to be taken as limiting the claims to the specific variables or values described in the specification and there identified by the same symbols.

We claim:

1. In apparatus for producing a digital signal to represent the sensed value of a changeable differential pressure DP, the combination comprising
   (a) a peizoresistive bridge formed on a silicon diaphragm,
   (b) a body defining two chambers with said diaphragm as a deformable wall therebetween, said chambers having inputs to receive two respective pressures P1 and P2 so that the diaphragm is strained as a function of the differential pressure DP, where $DP = P1 - P2$,
   (c) a summing amplifier having an output E,
   (d) circuit means for exciting said bridge and applying the output signal V from said bridge to the input of said summing amplifier, whereby said output E would normally and except for offset in said signal V and saturation in said amplifier change according to a known function of changes in the differential pressure DP in said chambers,
   (e) a solenoid valve connected between said two chambers and settable, by on-off control of the associated solenoid, to first and second states in which (1) said two chambers are isolated from one another and (2) said two chambers are in direct communication,
   (f) means for coupling into said two chambers respective changeable pressures $P_1$ and $P_2$ which create said changeable differential pressure DP,
   (g) a programmed digital computer effectively coupled to said amplifier and to said solenoid,
   (h) a settable correction signal source coupled to and controlled by said computer, together with means for applying a correction signal $V_c$ from such source to said summing amplifier so that the effective input to said amplifier becomes $(V - V_c)$ and its output E is proportional to $(V - V_c)$ except for saturation,
   (i) said digital computer and the program loaded therein collectively constituting
      (i1) means for first applying a control signal to said solenoid to place said valve in its second state thereby to substitutionally set the differential pressure seen by said diaphragm to a known value of zero,
      (i2) means operable while said valve is in its second state for setting said correction signal source so as to adjust the signal $V_c$ to a value $V_{po}$ which makes the amplifier output E equal to substantially zero,
      (i3) means for next applying a control signal to said solenoid to place said valve in its first state, and
      (i4) means, operable while said said valve is in its first state, for creating in said computer a first digital signal N having a value $N_x$ which is proportional to the then-existing amplifier output E and thus proportional to the difference $V_x - V_{po}$, where $V_x$ is the then-existing value of said bridge output and $V_{po}$ is the adjusted value of said correction signal, and
      (i5) means for computing and producing, from the digital signal value $N_x$, a second digital signal representing the then-existing value $DP_x$ of said differential pressure DP.

2. In apparatus for producing a digital signal to represent the sensed value of a changeable differential pressure DP, the combination comprising
   (a) a peizoresistive bridge formed in a silicon diaphragm,
   (b) a body defining two chambers with said diaphragm as a deformable wall therebetween, said chambers having two inputs to receive two respective pressures P1 and P2 so that the diaphragm is strained as a function of the differential pressure DP, where $DP = P1 - P2$,
   (c) circuit means for exciting said bridge and amplifying the output signal therefrom, said circuit means including an analog-to-digital converter (ADC) for producing a digital signal N representing the value of said output signal, said signal changing according to a known function of changes in the differential pressure DP in said chambers,
   (d) a solenoid valve connected between said two chambers and settable, by on-off control of the associated solenoid, to first and second states in which (i) said two chambers are isolated from one another and (ii) said two chambers are in direct communication,
   (e) means for coupling into said two chambers respective changeable pressures $P_1$ and $P_2$ which create said changeable differential pressure DP,
   (f) a programmed digital computer coupled to said ADC and to said solenoid, (g) said digital computer and the program loaded therein collectively constituting
  (g1) means for first applying a control signal to said solenoid to place said valve in its second state, thereby to substitutionally set the differential pressure seen by said diaphragm to a known value of zero,
  (g2) means for storing a digital value $N_1$ corresponding to the then-existing value of the digital signal N received from said ADC while said valve is in its second state,
  (g3) means for next applying a control signal to said solenoid to place said valve in its first state,
  (g4) means for receiving from said ADC the signal N having a value $N_x$ while said said valve is in its first state, and
  (g5) means for computing and producing a digital signal $P_y$ representing the value $DP_x$ of the differential pressure DP according to said known function applied to the difference $N_x - N_1$.

3. The method of signaling the value of a changeable differential pressure DP created by first and second pressures P1 and P2, where $DP = P1 - P2$, on a random or periodic basis and with substantial elimination of inaccuracy due to unforseeable and unknown changes due to offset in the apparatus components which are employed, said method comprising
  (a) connecting said pressures P1 and P2 respectively to the first and second inputs of a differential pressure transducer so that the latter normally responds to said changeable differential pressure DP, said transducer constituting means for producing an electric signal V which changes as a known function of changes in the value of said differential pressure DP, the signal being subject, however, to offset due to changes in associated physical conditions (e.g., temperature, humidity, aging, etc.) other than said differential pressure DP,
  (b) connecting a bi-state valve between the first and second inputs of said transducer, said valve in its first state being closed and in its second state being open,
  (c) when an updated value of the changeable pressure DP is to be determined, setting said valve to its second state, thereby to equalize the pressures at the two inputs of the transducer, so that the latter "sees" a substituted differential pressure value of zero, and determining the then-existing value $V_a$ of said electric signal, and
  (d) setting said valve to its first state and utilizing the then-existing value $V_x$ of said signal in conjunction with said determined value $V_a$ to arrive at a corrected value $DP_c$ for the then-existing value of said differential pressure DP.

4. The method set forth in claim 3 wherein said step (d) includes subtracting the signal value $V_a$ from the signal value $V_x$ to produce a corrected value $E_c$.

5. The method set forth in claim 3 wherein said step (d) includes subtracting the signal value $V_a$ from the signal value $V_x$ to produce a corrected signal value $E_c$, such the $E_c = V_x - V_a$, and utilizing said corrected value $E_c$ to determine from said known function the corrected then-existing value $DP_c$ of said changeable differential pressure.

6. In apparatus for signaling the value of a changeable differential pressure DP created by first and second pressures P1 and P2, where $DP = P1 - P2$, the combination comprising
  (a) a differential pressure transducer having first and second pressure inputs to which said first and second pressures P1 and P2 are respectively applied, said transducer including means for producing a signal V which changes as a known function of the differential DP of the pressure values at such inputs, said signal being subject to offset due to changes in at least one associated physical condition to which the transducer is subjected,
  (b) a bi-state valve connected between said first and second inputs of the transducer, said valve in its first state being closed and in its second state being open,
  (c) means for setting said valve to its second state, thereby to equalize the pressures existing at said first and second inputs so the transducer "sees" a substituted differential pressure value of zero,
  (d) means for storing the then-existing value $V_a$ of said signal when said valve is in its second state,
  (e) means for setting said valve to its first state so the transducer "sees" the changeble differential pressure DP which is equal to P1-P2, and
  (f) means responsive to the then-existing value $V_x$ of said signal when said valve is in its first state, in conjunction with said stored value $V_a$ for determining a corrected value $DP_c$ for said changeable differential pressure DP.

7. The invention set forth in claim 6 wherein said means (f) includes means for subtracting the signal value $V_a$ from the signal value $V_x$ to produce a corrected value $E_c$.

8. The invention set forth in claim 6 wherein said means (f) includes means for subtracting the signal value $V_a$ from the signal value $V_x$ to produce a corrected signal value $E_c$, where $E_c = V_x - V_a$, and means for determining from the signal value $E_c$ and said known function the corrected then-existing value $DP_c$ of said changeable differential pressure.

9. In apparatus for signaling the value of a changeable differential pressure DP created by first and second pressures P1 and P2, where $DP = P1 - P2$, the combination comprising
  (a) a body defining first and second chambers separated by a deformable diaphragm therebetween, said first and second chambers respectively having first and second inlets,
  (b) means on and associated with said diaphragm constituting a differential pressure transducer which produces a signal V that changes as a known function of the difference between the two pressures in said first and second chambers, said signal being subject to offset due to variations in at least one associated physical condition to which the transducer is subjected,
  (c) a valve associated with said body and controllable to reside in either a closed state or an open state in which said first and second chambers are respectively isolated or placed in direct communication,
  (d) means for coupling said first and second pressures P1 and P2 respectively to said first and second inlets, so that when said valve is in its closed state the pressures in said first and second chambers are respectively equal to P1 and P2 and said diaphragm is subjected to said differential pressure DP,
  (e) means for momentarily setting said valve to its open state, (f) means for storing the value $V_a$ of said signal V while said valve is in its open state, (g) means for restoring said valve to its closed state, and (h) means responsive to (1) the then-existing value $V_x$ of said signal while said valve is in its closed state and (2) the stored value $V_a$, for creating a corrected signal $DP_c$ which represents according to said known function the then-existing value of said changeble differential pressure DP compensated for any offset.

10. The combination set forth in claim 9 wherein said means (h) includes means for subtracting said signal value $V_a$ from said signal value $V_x$.

11. The combination set forth in claim 9 wherein said valve is a solenoid valve which is opened or closed when its solenoid is energized or deenergized, said means (e) includes means for energizing said solenoid, and said means (g) includes means for deenergizing said solenoid.

12. The combination set forth in claim 9 wherein said means (f) and said means (h) are in part constituted by a programmed digital computer.

13. The combination set forth in claim 12 wherein said programmed digital computer is coupled to control the setting of said valve momentarily to its open state each time prior to storage of said signal value $V_a$.

* * * * *